(12) United States Patent
Lin et al.

(10) Patent No.: US 6,774,185 B2
(45) Date of Patent: Aug. 10, 2004

(54) METAL HYDROXIDE FILLED RUBBER COMPOSITIONS AND TIRE COMPONENTS

(75) Inventors: Chen-Chy Lin, Hudson, OH (US); William L. Hergenrother, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 91 days.

(21) Appl. No.: 10/116,638

(22) Filed: Apr. 4, 2002

(65) Prior Publication Data

US 2002/0198300 A1 Dec. 26, 2002

Related U.S. Application Data

(60) Provisional application No. 60/281,426, filed on Apr. 4, 2001.

(51) Int. Cl.[7] .............. C08L 9/00; C08L 23/00; C08L 23/04; C08L 35/00
(52) U.S. Cl. .............. 525/191; 525/207; 525/232; 525/240; 525/241
(58) Field of Search .............. 525/191, 207, 525/232, 240, 241

(56) References Cited

U.S. PATENT DOCUMENTS

| | | | |
|---|---|---|---|
| 5,227,425 A | 7/1993 | Rauline | 524/493 |
| 5,438,101 A * | 8/1995 | Yamamoto et al. | 525/274 |
| 5,717,022 A | 2/1998 | Beckmann et al. | 524/493 |
| 5,719,207 A | 2/1998 | Cohen et al. | 524/213 |
| 5,780,538 A | 7/1998 | Cohen et al. | 524/494 |
| 5,866,171 A | 2/1999 | Kata | 425/46 |
| 5,876,521 A | 3/1999 | Koo et al. | 148/328 |
| 5,900,449 A | 5/1999 | Custodero et al. | 524/430 |
| 5,931,211 A | 8/1999 | Tamura | 152/209.5 |
| 5,971,046 A | 10/1999 | Koch et al. | 152/152.1 |
| 6,035,911 A * | 3/2000 | Matsumoto et al. | 152/209.5 |
| 6,046,279 A | 4/2000 | Roberts et al. | 525/285 |
| 6,573,412 B1 * | 6/2003 | Hogan et al. | 568/616 |

FOREIGN PATENT DOCUMENTS

| | | |
|---|---|---|
| EP | 0 673 792 | 9/1995 |
| EP | 0 733 673 | 9/1996 |
| EP | 0 807 603 | 11/1997 |
| EP | 0 881 255 | 12/1998 |
| EP | 0 948 029 | 10/1999 |
| EP | 0 969 038 | 1/2000 |
| EP | 1 000 965 | 5/2000 |

* cited by examiner

*Primary Examiner*—Nathan M. Nutter
(74) *Attorney, Agent, or Firm*—Arthur M. Reginelli; Meredith E. Palmer

(57) ABSTRACT

A tire component formed by a process comprising the steps of (A) vulcanizing a rubber composition comprising, (1) a rubber, (2) a modified polyolefin additive, (3) an aluminum hydroxide filler, and (4) a rubber vulcanizing agent.

25 Claims, 2 Drawing Sheets

METAL HYDROXIDE FILLED RUBBER COMPOSITIONS AND TIRE COMPONENTS

This application gains priority from U.S. Provisional Patent Application Serial No. 60/281,426, filed on Apr. 4, 2001.

FIELD OF THE INVENTION

This invention relates rubber compositions and tire components, especially tire treads, where the tire components and compositions include a metal hydroxide filler and a modified polyolefin additive.

BACKGROUND OF THE INVENTION

Rubber compositions, especially those used to prepare tire components, have traditionally been filled with carbon black. The need for tires that have less rolling resistance and improved wet traction led to the use of other fillers such as silica.

While silica filled tires provide reduced rolling resistance, especially when used in conjunction with a silane coupling agent, silica filled tires suffer from other disadvantages. For example, silica filled tire treads have a lower storage modulus than carbon black filled tire components. Also, the use of coupling agents, such as silane coupling agents, is expensive because overall raw materials costs increase and processing techniques must be adapted to compensate for the use of the silane.

Aluminum hydroxide has also been employed to achieve improved rolling resistance. As with silica, however, the use of aluminum hydroxide as a filler in combination with carbon black, silica, or both, improves rolling resistance at the sacrifice of other properties such as mechanical strength and toughness.

Because tire components that derive from rubber compositions including metal hydroxides, such as aluminum hydroxide, as a filler show some advantages, there is a need to offset the disadvantages associated with the use of these metal hydroxide fillers.

SUMMARY OF THE INVENTION

In general the present invention provides a tire component formed by a process comprising the steps of (A) vulcanizing a rubber composition comprising (1) a rubber, (2) a modified polyolefin additive, (3) an aluminum hydroxide filler, and (4) a rubber vulcanizing agent.

The present invention also includes a tire component prepared by a process comprising the steps of (1) mixing a rubber with from about 0.1 to about 25 parts by weight per 100 parts by weight rubber of a modified polyolefin additive, from about 1 to about 25 parts by weight per 100 parts by weight rubber of an aluminum hydroxide filler, and a vulcanizing amount of vulcanizing agent to form a tire compound, and (2) subjecting the tire compound to curing conditions.

The present invention further includes a tire component comprising (1) a rubber, (2) from about 0.1 to about 25 parts by weight per 100 parts by weight rubber of a maleic anhydride modified polypropylene, and (3) from about 1 to about 25 parts by weight per 100 parts by weight rubber of a metal hydroxide filler.

The use of polyolefin additives within tire compositions that include metal hydroxide filler, such as aluminum hydroxide filler, has advantageously offset many of the problems that have been associated with the use of metal hydroxide filler. In fact, the use of the polyolefin additive described herein has surprisingly lead to the discovery that both rolling resistance and handling performance can simultaneously be improved. Additionally, the combination of metal hydroxide and polyolefin additives within tire tread compositions has lead to the discovery that heat aged mechanical properties of the treads are stabilized despite the presence of the plastic.

DETAILED DESCRIPTION OF ILLUSTRATIVE EMBODIMENTS

Figure 1:
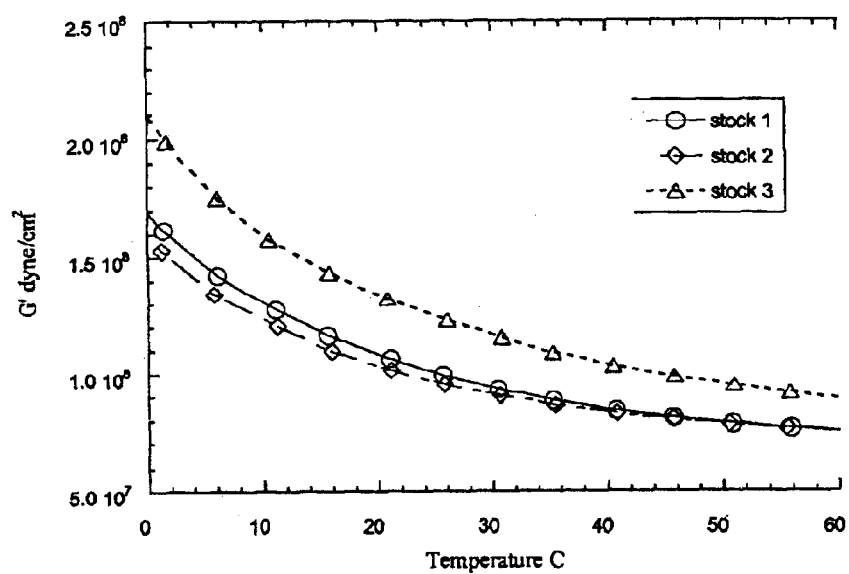
FIG. 1 is a graphical plot of the G' spectrum as a function of temperature of a rubber vulcanizate of the present invention as compared to controls.

The rubber compositions and tire components of this invention include a metal hydroxide filler and a modified polyolefin additive. In one embodiment, the rubber compositions include a rubber, a polyolefin additive, aluminum hydroxide filler, carbon black filler, silica filler, vulcanizing agents, dispersing agents, and rubber vulcanizing agents. Other additives that are typically employed in rubber compositions, especially those used to fabricate tires, may also be included.

Both synthetic and natural rubber may be employed within the rubber compositions. These rubbers, which may also be referred to as elastomers, include, without limitation, natural rubber, synthetic polyisoprene, poly(styrene-co-butadiene), polybutadiene, poly(styrene-co-butadiene-co-isoprene), poly(isoprene-co-styrene), poly(butadiene-co-isoprene) and mixtures thereof.

The modified polyolefin additive includes an α-olefin polymer that contains terminal or pendent moieties containing acid or anhydride groups.

The terminal or pendent moieties typically derive from unsaturated carboxylic acids or unsaturated anhydrides. Examples of unsaturated carboxylic acids include citraconic acid, cinnamic acid, methacrylic acid, and itaconic acid. Examples of unsaturated anhydrides include maleic anhydride, citraconic anhydride, and itaconic anhydride. The preferred terminal or pendent moieties are succinic anhydride groups, or the corresponding acid from a ring opening structure, that derives from maleic anhydride.

The α-olefin polymer backbone includes an α-olefin homopolymer, a copolymer of two or more α-olefins, or a copolymer of an α-olefin with a compatible monomer. The α-olefins can include from about 2 to about 8 carbon atoms, and more preferably from 3 to about 5 carbon atoms. Exemplary α-olefin monomers include ethylene, propylene, butene-1, and pentene-1. Exemplary monomers that can be copolymerized with α-olefins include vinyl aromatic monomers and diene monomers. An exemplary copolymer is poly(propylene-co-ethylene) that contains polyethylene crystals.

The modified polyolefins should contain from about 0.01 to about 3 parts by weight (pbw) of the functional moiety based upon the weight of the entire polymer. More preferably, the modified polyolefin should contain from about 0.1 to about 2 pbw of the functional moiety, an even more preferably from about 0.15 to about 1.0 pbw of the functional moiety.

The number average molecular weight of the modified polyolefins can vary greatly, although it is preferred that the number average molecular weight ($M_n$) be from about 20,000 to about 500,000, more preferably from about 100,000 to about 400,000, and even more preferably from about 150,000 to about 400,000, as determined by using standard GPC analysis with polystyrene as a standard. Generally, the molecular weight distribution (Mw/Mn) should be less than about 4.5, preferably less than about 4.0, and even more preferably less than about 3.8.

The modified polyolefin additives are typically prepared by grafting unsaturated carboxylic acids or unsaturated anhydrides to a polyolefin polymer.

The techniques employed to attach the terminal or pendent moieties that contain carboxylic acid or anhydride groups to a polyolefin polymer are well known in the art. For example, grafting maleic anhydride to a polyolefin is disclosed in U.S. Pat. No. 6,046,279, which is incorporated herein by reference.

The polymer backbone can be synthesized by using a number of polymerization techniques such as, but not limited to, the "Phillips catalyzed reactions" conventional Ziegler-Natta type polymerizations, and metallocene catalysis including, but not limited to, metallocene-aluminoxane and metallocene-ionic activator catalysis.

Exemplary α-olefin polymers include polyethylene, polypropylene, poly(ethylene-co-propylene), poly(propylene-co-butene-1), and poly(butene-1-co-ethylene). These α-olefin polymers can be either amorphous, semicrystalline, or crystalline polymers. The preferred polyolefins include crystalline or stereoregular polypropylene. Most polypropylene homopolymers that are commercially produced have an isotactic microstructure. The poly(propylene-co-ethylene) copolymers can be random or block copolymers. Preferably, these copolymers will contain some polyethylene crystals, although they should include a major amount of propylene units and only a minor amount of ethylene units. Preferably, these copolymers should contain less than about 40 percent by weight (pbw) ethylene units, more preferably from about 1 to about 30 pbw ethylene units, and more preferably from about 1.5 to about 25 pbw ethylene units.

Modified polyolefins are commercially available. For example, maleic anhydride functionalized polypropylene is available under the tradename EXXELOR™ PO1015 & 1020 (Exxon Mobil Chemical Company; Houston, Tex.), under the tradename PP-C™, CA1000, or 18707 (Elf Atochem; Philadelphia, Pa.), or under the tradename Polybond™ 3001, 3002, or 3150 (Uniroyal Chemical Company; Middlebury, Conn.).

The tire components and rubber compositions include at least one metal hydroxide filler. The metal hydroxide filler is preferably employed in conjunction with other inorganic fillers, organic fillers, or both.

Useful metal hydroxides include, but are not limited to, aluminum hydroxide, magnesium hydroxide, and calcium hydroxide. The preferred metal hydroxide is aluminum hydroxide. Useful aluminum hydroxide fillers include any aluminum hydroxide filler compounds that derive from partially calcinated aluminum hydroxide compounds, including those that have conventionally been employed to reinforce rubber compositions and tire components.

Aluminum hydroxide filler preferably has an average diameter of about 20 nanometers (nm) to about 2,000 nm, more preferably from about 25 nm to about 1,000 nm or smaller, and even more preferably from about 30 nm to about 50 nm.

Useful aluminum hydroxide preferably has a BET specific surface area of from about 0.5 to about 500 m$^2$/g, more preferably from about 1 to about 400 m$^2$/g, and even more preferably from about 2 to about 300 m$^2$/g.

Aluminum hydroxide filler may be treated with various surface treating agents. Non-limiting examples of surface treating agents include organic treating agents such as fatty acids and alcohols, and inorganic dispersants such as coupling agents, and fatty acid metal salts.

Useful aluminum hydroxide filler is commercially available from a number of sources including that available under the tradenames Hygilite™ (Showa Dendo K. K.; Japan), Baikalox™ (Baikowski Chimie; France), and RF22™ (Sumitono Chemical Co.; Japan).

Other inorganic fillers that may be used include silica, derivatives of aluminum hydroxide such as alumina, and clays (hydroxy aluminum silicates).

Useful silica (silicon dioxide) includes wet-process, hydrated silica produced by a chemical reaction in water, and precipitated as ultrafine spherical particles. These particles strongly associate into aggregates that in turn combine less strongly into agglomerates. The surface area, as measured by the BET method, gives the best measure of the reinforcing character of different silicas. Useful silicas preferably have a surface area of about 32 to about 400 m$^2$/g, preferably about 100 to about 250 m$^2$/g, and more preferably about 150 to about 220 m$^2$/g. The pH of the silica filler is generally about 5.5 to about 7 and preferably about 5.5 to about 6.8. Commercially available silicas include Hi-Sil™ 215, Hi-Sil™ 233, and Hi-Sil™ 190 (PPG Industries; Pittsburgh, Pa.). Useful commercial grades of different silicas are also available from other sources including Rhone Poulenc.

A coupling agent may optionally be added when an inorganic filler such as silica is used. Coupling agents include those compounds that are believed to react with both the rubber and the inorganic filler. One coupling agent conventionally used is bis-[3(triethoxysilyl) propyl]-tetrasulfide, which is commercially available under the tradename SI169 (Degussa, Inc.; New York, N.Y.). Other coupling agents include bis-[3(triethoxysilyl) propyl]-disulfide, which is commercially available under the tradename Silquest™ (Witco; Greenwich, Connecticut), mercapto propyl alkoxy silane, which is commercially available under the tradename Ciptane™ (Dow Corning; Midland, Michigan), and dithio diprionic acid or carboxylic acid disulfides, which are commercially available from Aldrich Chemical Company. In general, these coupling agents should be used in an amount from about 0.1 to 20% by weight based upon the weight of the inorganic filler.

Shielding and dispersing agents, which prevent or alleviate the agglomeration of inorganic filler particles such as silica, may also be used. Typically, these agents react or interact with the filler. Exemplary dispersing or shielding agents include silanes, amines, diols, polyethers, amides, and sugar fatty acid esters. U.S. Pat. Nos. 5,719,207, 5,780,538, 5,717,022, and EP 0890606 are incorporated herein by reference in this regard. Specific examples of these agents include sugar, fatty acids such as sorbitan fatty acids which are available from BASF (Mount Olive, N.J.), and octyl triethoxy silane, which is available from Dow Corning (Midland, Mich.). Generally, these shielding or dispersing agents may be used in an amount from about 0.1 to about 20% by weight based on the weight of the inorganic filler. In preferred embodiments, the coupling agents, shielding agents, and dispersing agents may be used in combination.

Useful carbon black may include any commonly available carbon black, but those having a surface area (EMSA) of at least 20 m$^2$/g, and more preferably at least 35 m$^2$/g up to 200 m$^2$/g or higher, are preferred. Surface area values used in this application are those determined by ASTM test D-1765 by using the cetyltrimethyl-ammonium bromide (CTAB) technique.

The rubber compositions of this invention can be cured in a conventional manner with known vulcanizing agents. For example, sulfur or peroxide-based curing systems may be employed. Also, see Kirk-Othmer, ENCYCLOPEDIA OF CHEMICAL TECHNOLOGY, 3$^{rd}$ Edition, Wiley Interscience, N.Y. 1982, Vol. 20, pp. 365–468, particularly VULCANIZATION AGENTS AND AUXILIARY MATERIALS pp. 390–402, or *Vulcanization* by A. Y. Coran, ENCYCLOPEDIA OF POLYMER SCIENCE AND ENGINEERING, 2$^{nd}$ Edition, John Wiley & Sons, Inc., 1989, which are incorporated herein by reference. Vulcanizing agents may be used alone or in combination. This invention does not appreciably affect cure times. Typically, vulcanization is effected by heating the vulcanizable composition; e.g., it is heated to about 170° C. Cured or crosslinked polymers may be referred to as vulcanizates, which are generally three-dimensional polymeric networks that are thermoset. The other ingredients, such as the modified polyolefin and fillers, are generally dispersed throughout this thermoset network.

The rubber compositions and tire components may also include other compounding additives such as accelerators, waxes, scorch inhibiting agents, processing aids, antidegradants, processing oils, zinc oxide, tackifying resins, reinforcing resins, fatty acids, and peptizers.

Fillers, such as carbon black, silica or aluminum hydroxide, are typically employed in an amount from about 1 to about 100 parts by weight per 100 parts by weight rubber (phr), and preferably from about 20 to about 90 parts by weight phr, and more preferably from about 40 to about 80 parts by weight phr.

Particularly, aluminum hydroxide filler should be employed in an amount from about 1 to about 25 parts by weight phr, preferably from about 2 to about 20 parts by weight phr, and more preferably from about 5 to about 15 parts by weight phr.

Carbon black may optionally be used in an amount from about 0.5 to about 60 parts by weight phr, preferably from about 1 to about 40 parts by weight phr, and more preferably from about 2 to about 30 parts by weight phr.

Silica may optionally be used in an amount from about 10 to about 100 parts by weight phr, preferably from about 15 to about 90 parts by weight phr, and more preferably from about 20 to about 80 parts by weight phr.

In a preferred embodiment, aluminum hydroxide, silica, and carbon black are used in combination. In this embodiment, the silica:carbon black ratio is from about 1:90 to about 99:1, more preferably from about 1:5 to about 5:1, and even more preferably from about 1:3 to about 3:1. And, the silica:aluminum hydroxide ratio of from about 3:1 to about 30:1, more preferably from about 5:1 to about 20:1, and even more preferably from about 6:1 to about 15:1.

The rubber compositions and tire components of the present invention will generally contain from about 0.1 to about 25 parts by weight of the modified polyolefin additive per 100 parts by weight rubber (phr). Preferably, the rubber compositions and tire components will contain from about 0.2 to about 20 parts by weight phr, even more preferably from about 0.5 to about 15 parts by weight phr, and still more preferably from about 1 to about 10 parts by weight phr of the modified polyolefin additive.

Those skilled in the art will be able to choose a useful amount of the other ingredients that may be employed in practicing the present invention. For example, it is generally known in the art of making tire components, such as treads, that sulfur should be employed in an amount from about 1 to about 10 parts by weight phr, and preferably from about 1.5 to about 6 parts by weight phr. Oils should be employed in an amount from about 1 to about 60 parts by weight phr, and preferably from about 5 to about 50 parts by weight phr.

Tire formulations are mixed by using mixing equipment and procedures conventionally employed in the art. Preferably, an initial masterbatch is prepared that includes the elastomer component and the reinforcing fillers, as well as other optional additives such as processing oil and antioxidants. Once this initial masterbatch is prepared, the vulcanizing agents are blended into the composition. Rubber compounding techniques and the additives employed therein are generally known as disclosed in *The Compounding and Vulcanization of Rubber*, by Stevens in RUBBER TECHNOLOGY SECOND EDITION (1973 Van Nostrand Reihold Company). The mixing conditions and procedures applicable to silica-filled tire formulations are also well known as described in U.S. Pat. Nos. 5,227,425, 5,719,207, 5,717,022, as well as EP 0890606, all of which are incorporated herein by reference. The composition can then be processed into tire components according to ordinary tire manufacturing techniques including standard rubber curing techniques. Tire components of this invention preferably include tire treads. The compositions, however, can also be used to form other elastomeric tire components such as subtreads, black sidewalls, body ply skims, bead fillers and the like. Pneumatic tires can be made according to U.S. Pat. Nos. 5,866,171; 5,876,527; 5,931,211; and 5,971,046, which are incorporated herein by reference.

Tire components of this invention preferably include tire treads. The composition can also be used to form other elastomeric tire components such as subtreads, sidewalls, body ply skims, bead fillers and the like. The use of polyolefin additives within tires treads that contain aluminum hydroxide filler leads to both reduced hysteresis loss while improving handling performance without the need for other additives such as particulate nylons.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

EXAMPLES

Three tire stocks were prepared from the formulations of Table I and by using the compounding protocol set forth in Table II within a 310 gram Brabender mixer set at 60 r.p.m.

TABLE I

|  | Stock 1 | Stock 2 | Stock 3 |
|---|---|---|---|
| Natural Rubber | 20.0 | 20.0 | 20.0 |
| Oil extended solution poly(styrene-co-butadiene) | 96.0 | 96.0 | 96.0 |
| Aluminum Hydroxide | 0.0 | 10.0 | 10.0 |
| Polyolefin Additive | 0.0 | 0.0 | 7.5 |
| Precipitated silica | 80 | 72.27 | 72.27 |

TABLE I-continued

|  | Stock 1 | Stock 2 | Stock 3 |
|---|---|---|---|
| Wax | 1.5 | 1.5 | 1.5 |
| Antioxidant[N-(1,3-dimethylbutyl)-N'-phenyl-p-phenylene-diamine | 0.95 | 0.95 | 0.95 |
| Sulfur | 3.6 | 3.6 | 3.6 |
| Accelerator[N-Cyclohexyl-2-benzothiazolsulfenamine] | 1.5 | 1.5 | 1.5 |
| Zinc oxide | 2.5 | 2.5 | 2.5 |
| Diphenyl Guanidine | 0.5 | 0.5 | 0.5 |
| Dioctyl phthalate | 6.0 | 6.0 | 6.0 |
| Aromatic processing oil | 15.0 | 15.0 | 15.0 |
| Si69 | 10.0 | 10.0 | 10.0 |

The aluminum hydroxide was obtained under the tradename RF22™ (Sumitomo Chemical Co., Japan), the oil extended solution poly(styrene-co-butadiene) was obtained under the tradename Duradene™ (Firestone Polymers, Akron, Ohio), and the polyolefin additive was maleated polypropylene obtained under the tradename OREVAC™ (Elf Autochem; France), The maleated polypropylene was characterized by having 0.48 weight percent of its polymeric units containing functional groups deriving from maleic anhydride.

TABLE II

| Master Batch Stage 1 | |
|---|---|
| Initial Temperature | 100° C. |
| 0 sec | charging polymers |
| 30 sec | charging carbon black, silica, shielding agent or Silanes and all pigments. |
| 5 min. | drop |
| Drop temperature | 175–180° C. |
| Master Batch Stage 2 | |
| Initial Temperature | 70° C. |
| 0 sec | charging remilled stock |
| 30 sec | charging Si69 |
| Drop Temperature | 155° C. |
| Final Batch Stage | |
| Initial Temperature | 90° C. |
| 0 sec | charging remilled stock |
| 30 sec | charging curing agent and accelerators |
| Drop Temperature | 105° C. |

The final compounds were sheeted and subsequently molded at 171° C. for 15 minutes. The vulcanizates were then tested for tensile properties according to ASTM D 412 at 25° C. The tensile test specimens were round rings with a diameter of 0.127 cm and a thickness of 0.191 cm. A specific gauge length of 2.54 cm was used. Dumbbell-shaped test specimens were also analyzed. Table III provides the results of the tests.

Figure 2:
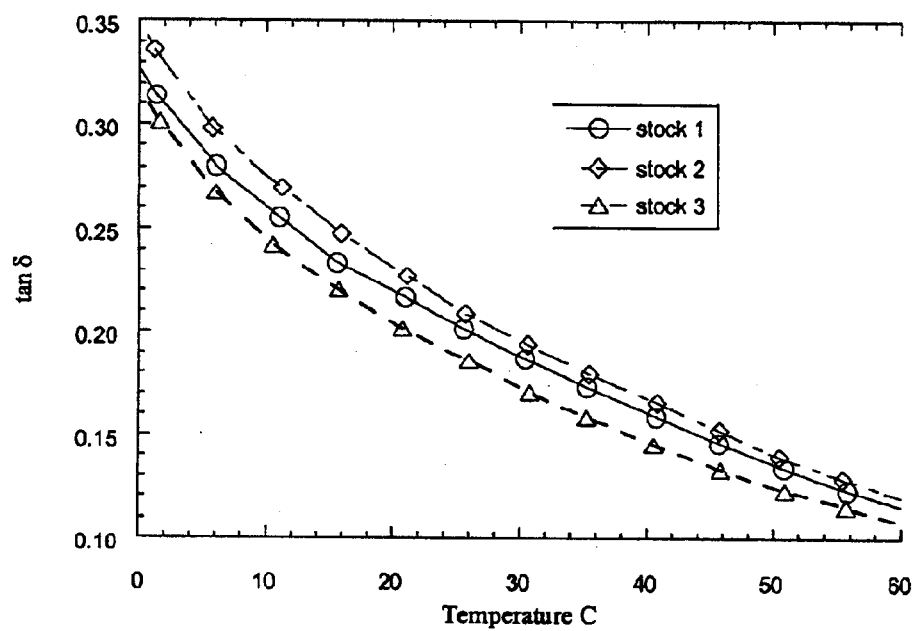
FIG. 2 is a graphical plot of the tan δ spectrum as a function of temperature of a rubber vulcanizate of the present invention as compared to controls.

The dynamic storage moduli were measured by temperature sweep experiments. The temperature sweep measurements were conducted with a frequency of 31.4 rad/sec using 0.5% strain for temperatures ranging from –100° C. to –10° C., and 2% strain for the temperature ranging from –10° C. to 100° C. Selected G' and tan δ data is listed in Table III. The temperature dependence of G' for each stock is shown in FIG. 1 and the temperature dependence of tan δ is shown in FIG. 2.

TABLE III

|  | Stock 1 | Stock 2 | Stock 3 |
|---|---|---|---|
| Round Ring Test Specimen | | | |
| 50% Modulus (MPa) | 1.97 | 1.78 | 2.16 |
| 300% Modulus (MPa) | 17.10 | 14.68 | 15.69 |
| Tensile at Break (MPa) | 19.56 | 17.73 | 18.88 |
| Elongation at break (%) | 333 | 347 | 359 |
| Toughness (MPa) | 28.30 | 26.83 | 31.31 |
| Dumbbell Specimens | | | |
| 50% Modulus (MPa) | 2.30 | 2.19 | 2.61 |
| 300% Modulus (MPa) | 13.67 | 12.49 | 13.66 |
| Tensile at Break (MPa) | 19.66 | 19.29 | 21.86 |
| Elongation at break (%) | 414 | 444 | 472 |
| Toughness (MPa) | 38.42 | 41.04 | 51.06 |
| G' @ 0° C. (MPa) | 1.70 | 1.61 | 2.12 |
| G' @ 25° C. (MPa) | 0.998 | 0.956 | 1.251 |
| G' @ 50° C. (MPa) | 0.78 | 0.78 | 0.96 |
| tan δ @ 50° C. | 0.1351 | 0.1400 | 0.1250 |

Various modifications and alterations that do not depart from the scope and spirit of this invention will become apparent to those skilled in the art. This invention is not to be duly limited to the illustrative embodiments set forth herein.

What is claimed is:

1. A tire component formed by a process comprising the steps of:
   (A) vulcanizing a rubber composition comprising:
      (1) a rubber;
      (2) a modified polyolefin additive, where the modified polyolefin additive includes pendant or terminal moieties deriving from unsataturated carboxylic acids or unsaturated anhydrides, and where said modified polyolefins contain from about 0.01 to about 3 parts by weight of the functional moiety based upon the entire weight of the polymer;
      (3) an aluminum hydroxide filler; and
      (4) a rubber vulcanizing agent.

2. The tire component of claim 1, where the rubber composition comprises from about 0.1 to about 25 parts by weight per hundred parts by weight rubber of the modified polyolefin, from about 1 to about 25 parts by weight per 100 parts by weight rubber of the aluminum hydroxide filler, and a vulcanizing amount of the vulcanizing agent.

3. The tire component of claim 1, where the carboxylic acids include citraconic acid, cinnamic acid, methacrylic acid, or itaconic acid, and where said unsaturated anhydrides include maleic anhydride, citraconic anhydride or itaconic anhydride.

4. The tire component of claim 1, where said modified polyolefins contain from about 0.1 to about 2 parts by weight of the functional moiety based upon the entire weight of the polymer.

5. The tire component of claim 4, where the modified polyolefin includes maleic anhydride functionalized polypropylene.

6. The tire component of claim 1, where the rubber composition further comprises carbon black.

7. The tire component of claim 6, where the rubber composition further comprises silica.

8. The tire component of claim 7, where the rubber composition includes a silica to carbon black ratio of from about 1:90 to about 99:1, and where the rubber composition includes a silica to aluminum hydroxide ratio of from about 3:1 to about 30:1.

9. A tire component comprising:
(1) a vulcanized rubber;
(2) from about 0.1 to about 25 parts by weight per 100 parts by weight rubber of a maleic anhydride modified polypropylene; and
(3) from about 1 to about 25 parts by weight per 100 parts by weight rubber of a metal hydroxide filler.

10. The tire component of claim 9, where the rubber composition is devoid of particulate nylon.

11. The tire component of claim 10, where the metal hydroxide is aluminum hydroxide.

12. A tire component formed by a process comprising the steps of:
(A) vulcanizing a rubber composition comprising:
(1) a rubber;
(2) a modified polyolefin additive, where the modified polyolefin additive includes pendant or terminal moieties deriving from unsataturated carboxylic acids or unsaturated anhydrides;
(3) an aluminum hydroxide filler; and
(4) a rubber vulcanizing agent, where said rubber vulcanizing agent is a sulfur-based curing agent.

13. The tire component of claim 12, where the rubber composition comprises from about 0.1 to about 25 parts by weight per hundred parts by weight rubber of the modified polyolefin, from about 1 to about 25 parts by weight per 100 parts by weight rubber of the aluminum hydroxide filler, and a vulcanizing amount of the vulcanizing agent.

14. The tire component of claim 12, where the carboxylic acids include citraconic acid, cinnamic acid, methacrylic acid, or itaconic acid, and where said unsaturated anhydrides include maleic anhydride, citraconic anhydride or itaconic anhydride.

15. The tire component of claim 14, where said modified polyolefins contain from about 0.01 to about 3 parts by weight of the functional moiety based upon the entire weight of the polymer.

16. The tire component of claim 15, where said modified polyolefins contain from about 0.1 to about 2 parts by weight of the functional moiety based upon the entire weight of the polymer.

17. A tire component comprising:
at least one vulcanized rubber selected from the group consisting of natural rubber, synthetic polyisoprene, poly(styrene-co-butadiene), polybutadiene, poly(styrene-co-buradiene-co-isoprene), poly(isoprene-co-styrene), and poly(butadiene-co-isoprene);
from about 0.01 to about 25 parts by weight per about 100 parts by weight rubber of a modified polyolefin additive, where the modified polyolefin additive includes pendant or terminal moieties deriving from unsataturated carboxylic acids or unsaturated anhydrides;
from about 1 to about 25 parts by weight per 100 parts by weight rubber of a metal hydroxide filler.

18. The tire component of claim 17, where the carboxylic acids include citraconic acid, cinnamic acid, methaciylic acid, or itaconic acid, and where said unsaturated anhydrides include maleic anhydride, citraconic anhydride or itaconic anhydride.

19. The tire component of claim 18, where said modified polyolefins contain from about 0.01 to about 3 parts by weight of the functional moiety based upon the entire weight of the polymer.

20. The tire component of claim 17, where the rubber composition is devoid of particulate nylon.

21. The tire component of claim 20, where the metal hydroxide is aluminum hydroxide.

22. The tire component of claim 12, where the rubber composition consist essentially of the rubber, the modified polyolefin additive, the aluminum hydroxide filler, the rubber vulcanizing agent, and optionally one or more of carbon black, silica, coupling agents, dispersing agents, shielding agents, accelerators, waxes, scorch inhibiting agents, processing aids, antidegradants, processing oils, zinc oxide, tackifying resins, reinforcing resins, fatty acids, or peptizers.

23. The tire component of claim 17, where the rubber composition consists essentially of the vulcanized rubber, the modified polyolefin additive, the metal hydroxide filler, and optionally one or more of carbon black, silica, coupling agents, dispersing agents, shielding agents, accelerators, waxes, scorch inhibiting agents, processing aids, antidegradants, processing oils, zinc oxide, tackifying resins, reinforcing resins, fatty acids, or peptizers.

24. A process for preparing a tire component comprising the step of:
(A) vulcanizing a rubber composition comprising:
(1) a rubber;
(2) a modified polyolefin additive, where the modified polyolefin additive includes pendant or terminal moieties deriving from unsataturated carboxylic acids or unsaturated anhydrides, and where said modified polyolefins contain from about 0.01 to about 3 parts by weight of the functional moiety based upon the entire weight of the polymer;
(3) an aluminum hydroxide filler; and
(4) a rubber vulcanizing agent.

25. A process for preparing a tire component comprising the step of:
(A) vulcanizing a rubber composition comprising:
(1) a rubber;
(2) a modified polyolefin additive, where the modified polyolefin additive includes pendant or terminal moieties deriving from unsataturated carboxylic acids or unsaturated anhydrides;
(3) an aluminum hydroxide filler; and
(4) a rubber vulcanizing agent, where said rubber vulcanizing agent is a sulfur-based curing agent.

* * * * *

UNITED STATES PATENT AND TRADEMARK OFFICE
CERTIFICATE OF CORRECTION

PATENT NO.    : 6,774,185 B2
DATED         : August 10, 2004
INVENTOR(S)   : Chen-Chy Lin and William L. Hergenrother It is certified that error appears in the above-identified patent and that said Letters Patent is hereby corrected as shown below:

Column 8,
Line 34, delete the word "unsataturated" and insert the word -- unsaturated --.

Column 9,
Lines 18 and 52, delete the word "unsataturated" and insert the word -- unsaturated --.

Column 10,
Lines 36 and 49, delete the word "unsataturated" and insert the word -- unsaturated --.

Signed and Sealed this

First Day of February, 2005

JON W. DUDAS
*Director of the United States Patent and Trademark Office*